Aug. 19, 1969  J. C. LITTMANN  3,462,717
REVERSE SWITCHING MECHANISM FOR HEADLIGHT COVER ACTUATOR
Filed Aug. 31, 1967  2 Sheets-Sheet 2

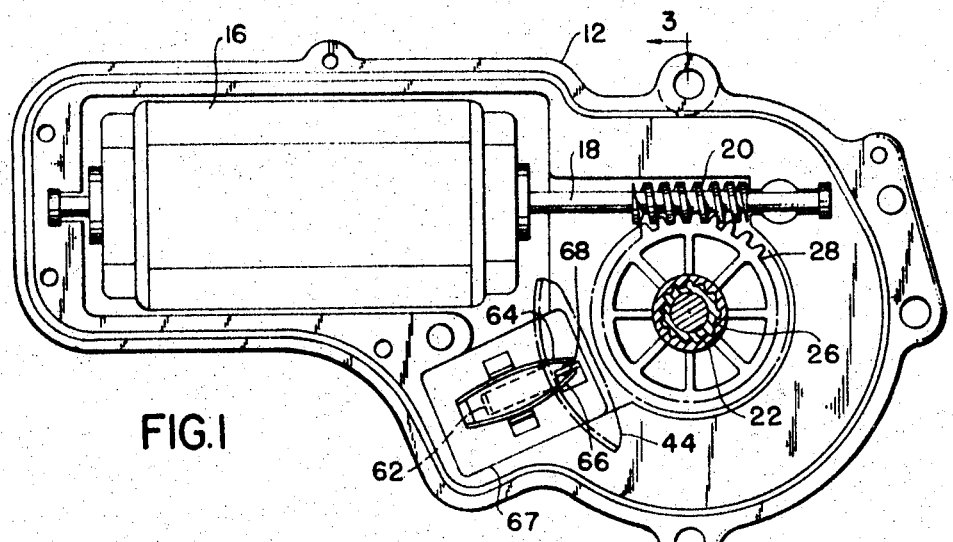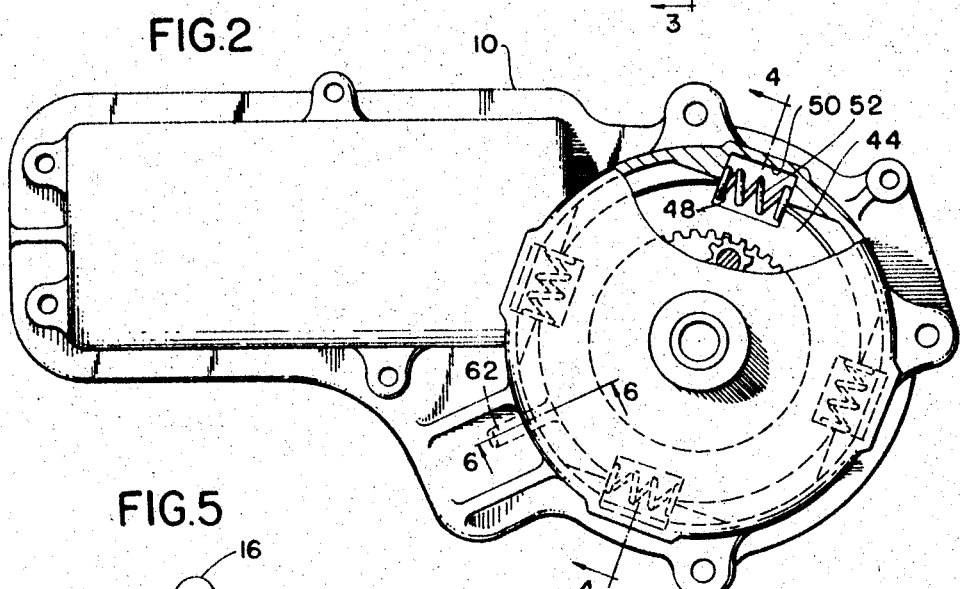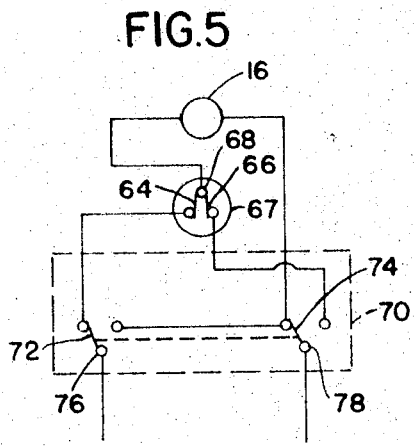

INVENTOR
JOSEPH C. LITTMANN
BY Whittemore,
Hulbert & Belknap
ATTORNEYS

United States Patent Office 3,462,717
Patented Aug. 19, 1969

3,462,717
REVERSE SWITCHING MECHANISM FOR
HEADLIGHT COVER ACTUATOR
Joseph C. Littmann, Grosse Pointe Woods, Mich., assignor to Ferro Manufacturing Corporation, Detroit, Mich., a corporation of Michigan
Filed Aug. 31, 1967, Ser. No. 664,812
Int. Cl. H01h 3/58, 9/54
U.S. Cl. 335—74        8 Claims

ABSTRACT OF THE DISCLOSURE

Headlight cover actuating mechanism including a single motor, friction clutches, and torque responsive mechanism to de-energize the motor when further movement of both headlight covers is terminated, including means for re-energizing the motor if further movement of either or both of the covers in the same direction is permitted.

Background of the invention

With the advent of movable headlight covers, difficulties have been encountered as a result of one or both of the headlight covers being retained in either limiting position by external forces as for example, ice frozen onto the cover. With this condition existing, the energization of the motor to open both covers may fail to open the covers and may leave the motor energized with resulting damage thereto.

In the past, if one of the headlight covers was frozen shut for example, some systems have prevented movement of either headlight cover.

Where the switch controlling the headlight covers is associated with the headlight switch so that energization of the motor to open the covers takes place concurrently with turning on the headlights, it would be desirable for either of the covers which is free to move to open position together with a provision to effect automatic opening of the other headlight cover when it becomes free to move, as for example, as a result of melting of the ice resulting from heat from the head lamp.

Summary of the invention

In accordance with the present invention, a single motor is connected to the two headlight covers through independently operable friction clutches, each of which is adapted to slip at a predetermined torque. The motor which operates the headlight covers is controlled by a torque responsive switch adjusted so that when further movement of both of the headlight covers is arrested, the torque developed is sufficient to operate a cut-off switch. However, the torque developed when only one of the headlight covers is jammed is insufficient to operate the switch.

The switching means comprises two over-center contact devices in association with a double-throw, double-pole manually operated switch. With this arrangement, if one of the headlight covers is jammed, as for example, in closed position, the other headlight cover is moved to full open position, at which time further movement is prevented and the torque responsive switch shuts off the motor. The torque responsive switch however, includes resilient means applying a torque to switch actuating means which is effective to produce initial opening movement of the stuck headlight cover whenever it is released, thus permitting further movement until the second headlight cover reaches full open position. At this time total torque developed by both of the friction clutches is sufficient to again open the motor switch, thus terminating the opening operation.

It is accordingly an object of the present invention to provide automatically operable means effective to provide for full opening of either or both headlight covers upon actuation of the device, as permitted by external conditions followed by further opening of either cover if initial opening movement thereof was prevented, followed in turn by final shut-off of the motor when both of the headlight covers reaches fully open or fully closed position as desired.

Other objects and features of the invention will become apparent as the description proceeds, especially when taken in conjunction with the accompanying drawings, illustrating a preferred embodiment of the invention.

Brief description of the drawings

FIGURE 1 is a plan view of a portion of the operating mechanism received in one housing portion with the other housing portion removed.

FIGURE 2 is a view of the other housing portion, with parts broken away to expose operating mechanism.

FIGURE 5 is a wiring diagram.

FIGURE 6 is a fragmentary sectional view on the line 6—6, FIGURE 2.

Description of the preferred embodiment

Figure 3:
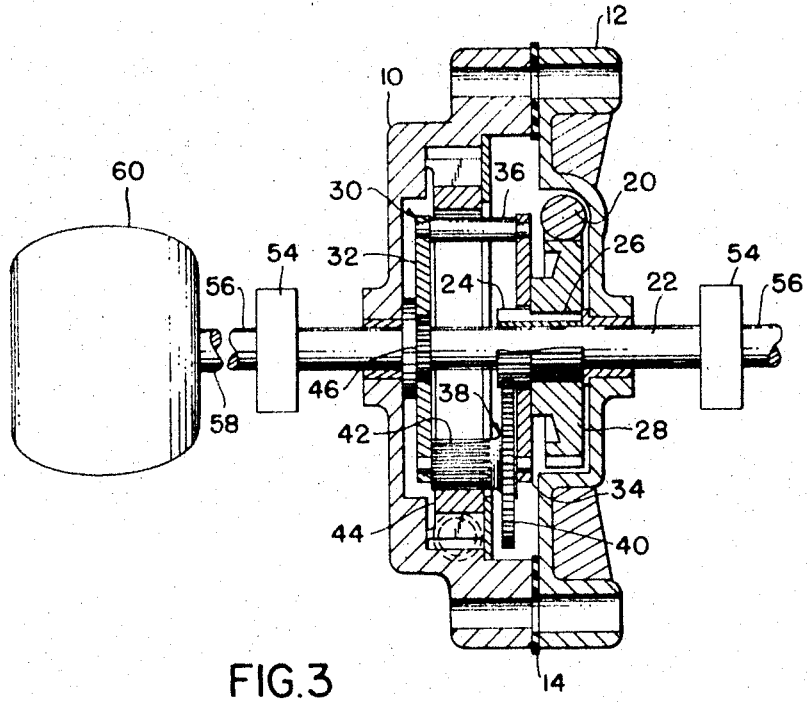
FIGURE 3 is a section on the line 3—3, FIGURE 1, on a somewhat enlarged scale.
Figure 4:
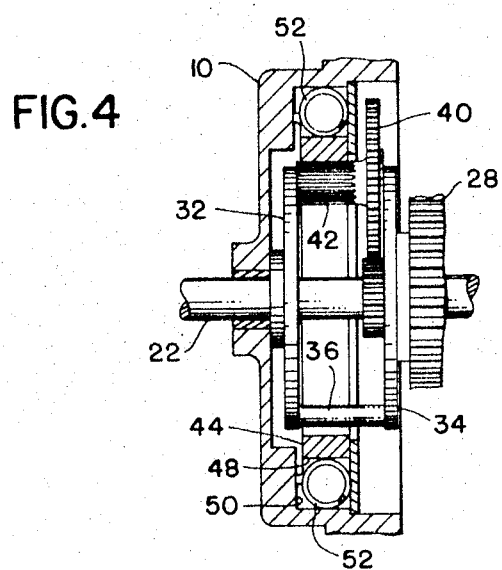
FIGURE 4 is a section on the line 4—4, FIGURE 2, on a somewhat enlarged scale.

The operating mechanism is essentially housed within a two-part housing comprising the main housing portion 10 and a cover portion 12, adapted to be secured together with a gasket 14 interposed as best seen in FIGURE 3. Received in the housing is an electric motor 16 having an output drive shaft 18 carrying a worm 20. Extending through the housing is an output drive shaft 22 on which is provided a sun gear 24 having a reduced portion 26 splined to a worm gear 28 in mesh with the worm 20.

A carrier frame indicated generally at 30 comprising plates 32 and 34 is provided, the plates being interconnected by pins 36 and by rotatable planet gears indicated generally at 38 and including gear portions 40 in mesh with the sun gear 24 and reduced pinions 42 in mesh with an internal gear 44. The plate 34 is provided with a central opening large enough to receive the sun gear 24 therein for relative rotation. The plate 32 is provided with a splined opening for connection to a spline portion 46 on the shaft 22.

The internal gear 44 is provided with a plurality of peripheral recesses 48 and the cover 12 is provided with similarly arranged recesses 50, the two recesses forming a pocket as illustrated in FIGURE 2, adapted to receive coil compression springs 52. Accordingly, the compression springs 52 oppose rotation of the internal gear 44 but are yieldable to permit limited angular movement thereof dependent upon the load transmitted by the shaft 22.

The shaft 22 at opposite ends thereof is connected to friction clutches or torque transmitting devices 54 each of which is designed to transmit a predetermined torque. Each of the devices 54 has an output shaft 56 which is adapted to be connected to the operating shafts 58 of suitable devices herein illustrated as rotatable headlight covers 60. In practice the shafts 56 and 58 may be interconnected by, or may consist of, flexible drive shafts extending from the housing to the separate headlight covers.

The internal gear 44 has a switch operating finger 62 which as seen in FIGURE 1 is positioned between two resilient snap-acting overcenter contact arms 64 and 66 of a single pole, double-throw switch 67. Arms 64 and 66 are doubly concavely curved so as to provide a snap action and when the switch operating finger 62 moves a predetermined amount in a clockwise direction it will flex the left hand end of the arm 64 and this in turn will result in a snap-acting overcenter abrupt movement of the contact engaging portion of the arm away from the contact 68. This abrupt movement prevents arcing and sputtering as is well understood. It will be observed that the switch 67 is thus operable in response to the sum of the torques transmitted by the two friction clutches 54, and that it is responsive to the torque transmitted in either forward or reverse direction.

Referring now to FIGURE 5 there is illustrated the circuit in which a manual double-throw, double pole switch indicated generally at 70 is provided on the dash and the single pole, double-throw torque responsive switch 67 is connected as shown to the motor 16. Switch arms 72 and 74 are arranged so that with the parts in the relationship illustrated in FIGURE 5, a circuit is completed from a pole 76 through the switch arm 72, the switch arm 64, the motor 16, and the switch arm 74 to the pole 78. This circuit is interrupted whenever the flexible switch arm 64 is caused to snap away from the common contact 68 of the switch 67. The motor 16 may be energized in reverse direction by shifting the switch arms 72 and 74 to the right, at which time a circuit is completed from pole 76 through the motor 16 in the reverse direction through the switch arms 66 and 74 to the pole 78.

The springs 52 may be selected such that a torque for example of 350 in./lbs. on the internal gear 44 is required to open either arm 64 or 66 of the torque responsive switch 67. If both of the headlight covers operate freely when the manual selector switch is operated, both headlight covers will move to limiting position, either fully closed or fully open, at which time further movement of both is prevented and a torque is developed by slipping of both friction clutches 54 which is equal to the sum of the torque transmitted by each. The friction clutches are selected or adjusted such that the sum of the torque transmitted by both clutches exceeds the value at which the torque responsive switch 67 operates. Thus, when the headlight covers reach either fully open or fully closed position, further operation of the motor is terminated by opening of the switch arm 64 or 66, dependent upon the direction of movement. Inasmuch as the motor is connected through worm and worm gear transmission means, thus providing an irreversible connection, the switch arm will remain open until the manual switch is operated in the opposite direction.

If however, due to ice or other conditions, one of the headlight covers is movable whereas the other is blocked against movement, then the motor will operate transmitting torque to the internal gear 44 developed by one of the friction clutches 54 but the torque required to operate the freely movable headlight cover is insufficient to cause operation of the torque responsive switch 67. However, when the movable headlight cover reaches limiting position then both of the friction clutches slip, developing a torque equal to the sum of the torque transmitted through each of the clutches which is sufficient to operate the torque responsive switch 67. At this time of course, the motor has cut-out and the parts will remain in the position which caused de-energization of the motor due to the worm-worm gear combination in the transmission. At this time however, the springs 52 are stressed and are applying a torque to the internal gear 44 tending to cause continued movement of the headlight cover in the direction in which it was intended to move. The headlight normally develops sufficient heat to melt the ice which was jamming the headlight cover in a short time and when this occurs the springs 52 effect sufficient rotation of the internal gear 44 to again close the open contact in the torque responsive switch 67, permitting continued running of the motor to complete the movement of the previously jammed headlight cover. When this second headlight cover reaches limiting position the mechanism will again develop a torque equal to the sum of the torque transmitted through the friction clutches 54, which will again open the appropriate contact of the torque responsive switch 67, leaving the parts in condition for reverse operation of the headlight covers by reverse movement of the manually operable selector switch including contact arms 72, 74.

The drawings and the foregoing specification constitutes a description of the improved reverse switching mechanism for headlight cover actuator in such full, clear, concise and exact terms as to enable any person skilled in the art to practice the invention, the scope of which is indicated by the appended claims.

What I claim as my invention is:

1. A headlight cover actuator comprising a motor, drive means comprising two branch drive connections extending from said motor and each branch adapted to be connected to a headlight cover, a friction clutch in each branch drive connection, torque responsive switch means including a switch connected to said motor, a movable switch operator, torque responsive means responsive to the sum of the torques transmitted by said clutches operable to move said movable switch operator in accordance with the sum of the torques transmitted by said clutches to said switch, said switch being operable to open only when both of said clutches are transmitting the torque at which they are set to slip.

2. An actuator as defined in claim 1 in which the means responsive to the sum of the torques transmitted by said clutches comprises resilient means and a member in said drive means movable against said resilient means to move said switch operator an amount determined by the sum of the torques transmitted by said clutches.

3. An actuator as defined in claim 1 in which the means responsive to the sum of the torques transmitted by said branch connections is responsive to torque transmitted in either direction.

4. An actuator as defined in claim 2, the drive connections including irreversible drive means operable to maintain said resilient means stressed when said motor is deenergized, so that motor operation is resumed when opposition to movement of one headlight cover is sufficiently reduced to permit further movement thereof.

5. An actuator as defined in claim 1, said drive means comprising epicyclic gearing connected to said motor, a drive shaft connected to said gearing, and separate drive shafts connecting said shaft to the headlight covers.

6. An actuator as defined in claim 5, said clutches being connected in the branch drive connections.

7. An actuator as defined in claim 5, said epicyclic gearing comprising an internal gear, planet gears in mesh with said internal gear, a cage carrying said planet gears and connected to said shaft, a housing in which said gearing is mounted, and opposed springs connected between said housing and internal gear yieldable in either direction upon the development of predetermined torque in said branch drive connections in either direction to open said clutch.

8. An actuator as defined in claim 2, said torque responsive switch comprising over-center snap-acting forward and reverse contact arms, and a manual switch for selectively energizing said motor in forward or reverse direction including a circuit through the contact carried by one or the other of said contact arms.

References Cited

UNITED STATES PATENTS

| | | | |
|---|---|---|---|
| 1,218,236 | 3/1917 | Backscheider | 74—801 |
| 1,883,164 | 10/1932 | Vassakos | 192—150 |
| 2,422,973 | 6/1947 | Martin. | |
| 2,945,925 | 7/1960 | Gessell | 192—150 |
| 3,072,931 | 1/1963 | Miller. | |
| 3,194,371 | 7/1965 | Rabinow | 192—150 |
| 3,312,916 | 4/1967 | Hoover | 200—47 |

BERNARD A. GILHEANY, Primary Examiner

H. BROOME, Assistant Examiner

U.S. Cl. X.R.

74—665